United States Patent [19]

Amberger et al.

[11] 3,835,696

[45] Sept. 17, 1974

[54] MOUNTING STRUCTURE FOR VIBRATION DETECTING PROBE

[75] Inventors: Ronald F. Amberger, Jeannette; David M. Mizikar, Mt. Pleasant, both of Pa.

[73] Assignee: Carrier Corporation, Syracuse, N.Y.

[22] Filed: July 31, 1972

[21] Appl. No.: 276,498

[52] U.S. Cl. .................................... 73/70, 73/71.4
[51] Int. Cl. ........................................... G01h 11/00
[58] Field of Search .............. 73/70, 70.2, 71, 71.2, 73/71.4

[56] References Cited
UNITED STATES PATENTS

| | | | |
|---|---|---|---|
| 3,512,402 | 5/1970 | Foster | 73/71.4 |
| 3,776,027 | 12/1973 | Campbell | 73/70 |

*Primary Examiner*—James J. Gill
*Attorney, Agent, or Firm*—J. Raymond Curtin

[57] ABSTRACT

A vibration detecting probe is mounted in a holder having threaded engagement with the inner end of the bore in a support fixed in the casing of the machine. The function of the probe is to detect vibration in or caused by an element of the machine rotating at high speed. A probe adjusting member is accessible externally of the outer end of the support and is fixedly connected to the probe for effecting rotation thereof for axial movement toward and from the rotating element of the machine. The probe adjuster consists of a member extending axially in the support and which is resiliently deflectable in a direction transverse to the axis thereof from a straight form to a curve form. Means is provided for applying tension in the adjuster to prevent any movement or vibration of the adjusted probe holder. Upon the probe holder being unthreaded from the support, the resilient deflectable member permits withdrawal of the probe holder from the support regardless of low clearance over the support.

5 Claims, 2 Drawing Figures

MOUNTING STRUCTURE FOR VIBRATION DETECTING PROBE

BACKGROUND OF THE INVENTION

It is common practice to provide vibration detecting probes in machines having components rotating at high speed such, for example, as steam turbines and rotatable gas compressors. Such detectors serve to detect the development of vibration before it becomes of such magnitude as to result in damage to the machine components.

There are many structural arrangements for mounting vibration detecting probes in such machines. Conventionally, such structures included a rigid probe supporting member, which precludes mounting the vibration probe in an area where a portion or component of the machine creates a close overhead clearance, whereby the probe cannot be removed axially from the machine casing. This invention has as an object a structure for mounting a vibration detecting probe and removal of the same from the machine casing in a location having a close overhead clearance.

SUMMARY OF THE INVENTION

A support structure is fixedly mounted on the casing of the machine and includes a tubular member extending inwardly toward the shaft or other rotating component of the machine. The probe is mounted in a holder which is threaded in the inner end of the support tube. A resilient deflectable adjusting member is fixed to the probe holder and extends therefrom through the tube. The adjusting member has a terminal arranged externally of the outer end of the support tube. The adjusting member is preferably in the form of a flexible shaft or a close wound helical spring. Upon rotation of the adjusting member, rotation is imparted to the probe holder, which is accordingly adjusted axially of the support due to the threaded connection thereto. The probe is also threaded in the holder and accordingly may be initially adjusted relative thereto, and means is provided for locking the probe in adjusted relation to the holder. A tensive means is provided to place the adjusting member under tension, thereby effecting tight engagement between the probe holder and the inner end of the supporting tube.

DESCRIPTION OF THE PREFERRED EMBODIMENT

Figure 1:
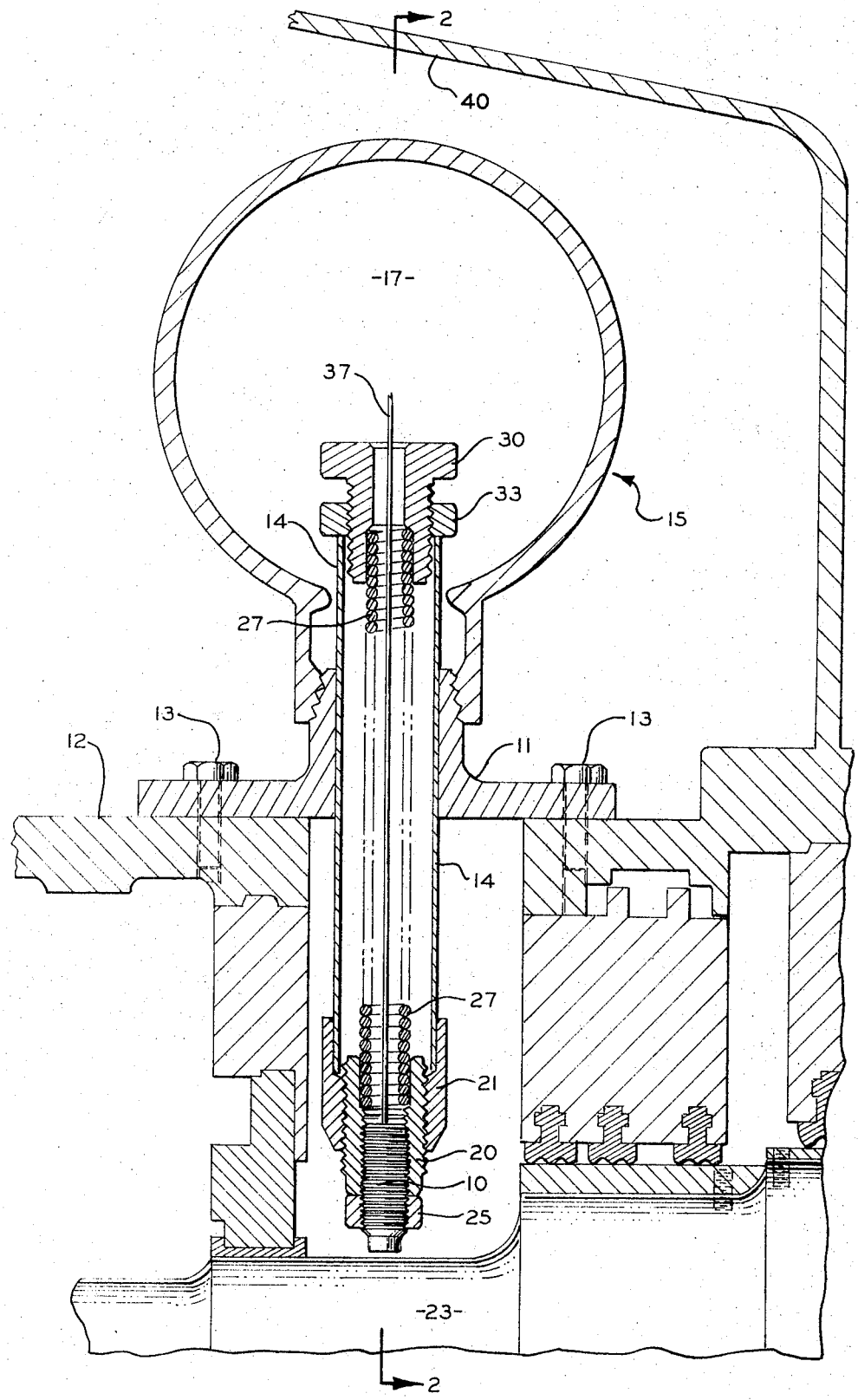
FIG. 1 is a vertical sectional view of a probe mounting structure embodying our invention, and including a contiguous portion of the casing and rotor shaft of a turbine.

The probe 10 is mounted in a support structure including a base 11 fixed to the machine casing 12 as by screws 13. The base 11 is formed with an aperture in which there is fixedly mounted a support tube 14. Preferably, the support structure also includes an enclosure 15 mounted on the base 11 by threaded connection. The enclosure 15 is of circular form, open at one side and formed with a closure wall 17 at the opposite side.

The probe 10 is threaded into a probe holder 20, which in turn is threaded into the tube 14. In the embodiment shown, a sleeve 21 is fixedly secured to the inner end of the tube 14 and becomes an integral part thereof. The probe holder 20 is threaded into the sleeve 21. The probe 10, because of the threaded connection with the holder, is adjusted axially thereof toward and from the machine shaft 23, and is locked in adjusted position by jam nut 25. A probe holder adjusting member is fixed to the probe holder and extends axially of the tube 14. Preferably, and in the form shown, the adjusting member consists of a close wound helical spring 27, the inner end of which is fixedly secured to the probe holder 20. There is fixedly secured to the outer end of the adjusting spring 27 a terminal member 30 located exteriorly of the outer end of the tube 14.

As illustrated, the outer end of the tube 14 communicates with the interior of the enclosure 15. It will be apparent that the spring 27 functions similarly to a flexible shaft and upon rotation thereof, rotation is imparted to the probe holder 20 to effect axial adjustment thereof, relative to the tube 14, by means of the threaded engagement between the probe holder 20 and the tube sleeve 21.

Means is provided for restraining movement between the probe holder 20 and the tube 14 and maintaining the probe holder in adjusted position. This means is operable to apply axial tension on the spring 27. In the arrangement shown, the cylindrical portion of the terminal 30 is formed with external threads to receive a nut 33. When the probe holder 20 has been adjusted, by rotation of the terminal 30, the terminal is held against further rotation and the nut 33 tightened downwardly against the outer end of the tube 14. It will be apparent that this operation applies axial tension on the spring 27 resulting in fluid tight engagement between the threaded probe 10 and the probe holder 20. Also, it results in the nut 33 being held in tight abutting engagement against the outer end of the tube. Accordingly, with this arrangement, the probe is held tightly against vibration and is restrained from axial displacement.

Figure 2:
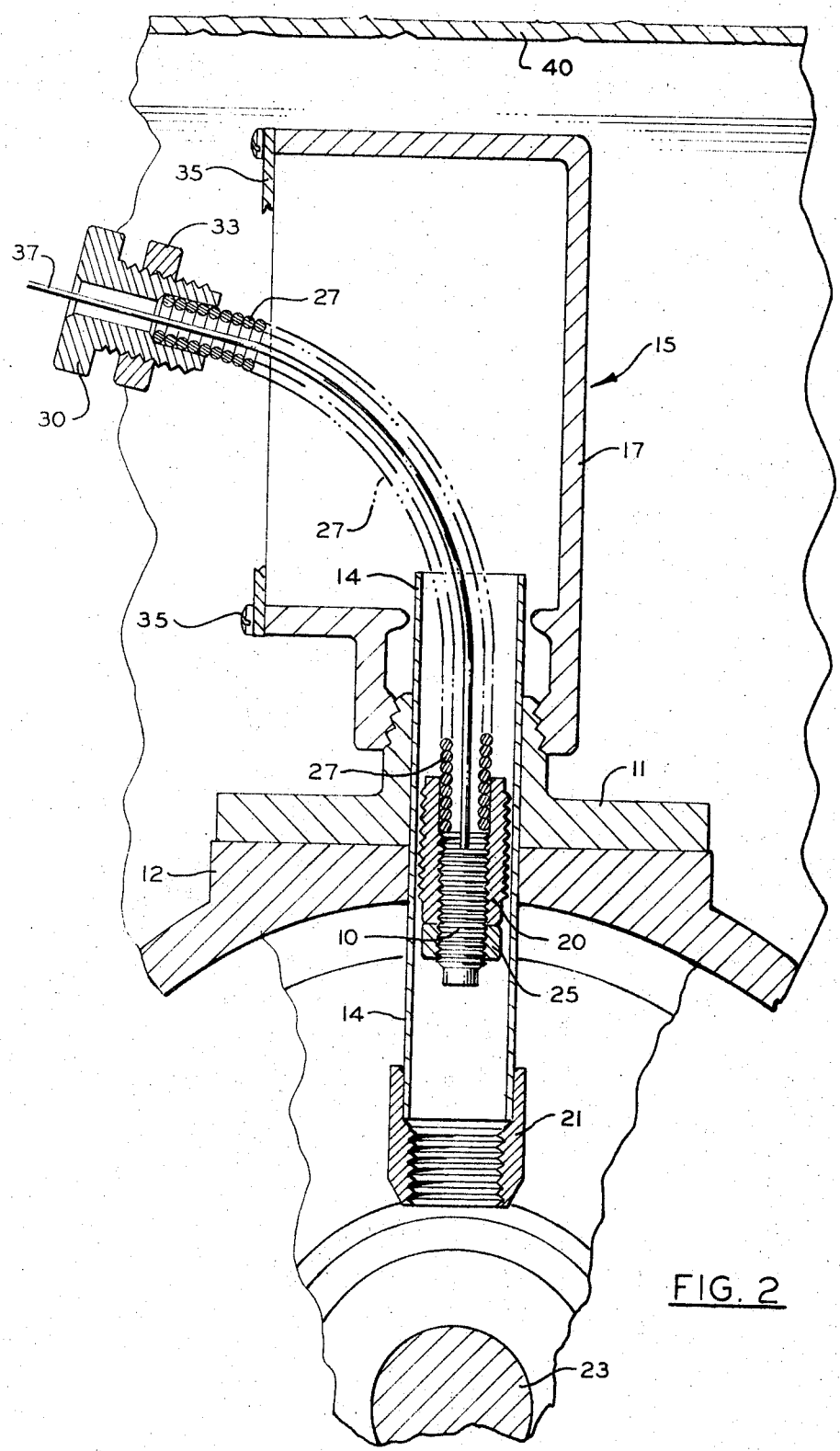
FIG. 2 is a view taken as indicated by the line 2—2, FIG. 1, with the probe partially withdrawn from the machine.

The spring 27 is a resilient deflectable member. That is, it can be bent from straight form to a curvature. When the probe holder 20 has been unthreaded from the sleeve 21, by rotation of the terminal 30, the spring and the probe holder may be withdrawn outwardly through the tube as illustrated in FIG. 2. Due to the fact that the spring is deflectable to curved form, the spring and the probe holder can be conveniently drawn outwardly from the enclosure 15 upon removal of the closure cover 35. Withdrawal of the probe holder and probe from the supporting structure does not put any strain on the conductor 37 which completes a circuit from the detecting probe to instrumentation which functions to indicate a situation of vibration by operation of the probe 10.

The probe is maintained in tight fluid engagement with the tube 14. It may be conveniently adjusted or withdrawn from the enclosure while the machine is in operation. In view of the fact that the probe is removable through the enclosure 15, a portion of the machine, such as the flange 40 extending in close overhead relation to the probe supporting structure, presents no problem in the removal of the probe.

While we have described the preferred embodiments of our invention, it is to be understood that the inven-

We claim:

1. A structure for mounting a vibration detecting probe in proximity to a rotating member journaled for high speed rotation in a machine casing comprising a support structure fixedly mounted on said casing and including a tubular member extending inwardly thereof toward said rotating member, a probe holder having threaded engagement with the inner end of said tubular member, a probe fixedly mounted in said holder, a probe holder adjusting member fixed to said probe holder and extending axially of said tubular member, said adjusting member being provided with a terminal accessible externally of the outer end of said tubular member to effect rotation of said adjusting member and said probe holder for adjusting the same toward and from said rotating member, said adjusting member being resiliently deflectable in a direction transverse to the axis thereof from straight form to curved form, and tension means operable to apply axial tension on said resiliently deflectable adjusting member.

2. A vibration probe mounting structure as set forth in claim 1 wherein said probe is adjustable axially in said probe holder and means for locking said probe in adjusted position.

3. A vibration probe mounting structure as set forth in claim 1 wherein said resilient deflectable adjusting member consists of a close wound helical spring.

4. A vibration probe mounting structure as set forth in claim 1 wherein said tension means consists of a threaded member cooperable with said terminal and said tubular member for applying outward axial force on said adjusting member.

5. A vibration probe mounting structure as set forth in claim 1 wherein said tension means consists of a nut threaded on said terminal and abutting against the outer end of said tubular member.

* * * * *